1857,031

BEST AVAILABLE COPY

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED DECEMBER 17, 1968

857 O.G. 696

680,303

METHINE COMPOUNDS FROM ISOINDOLO[1,2-b] BENZOTHIAZOLIUM SALTS

Getler Irick, Jr., % Tennessee Eastman Company, Box 511, Kingsport, Tenn. 37662

Filed Nov. 3, 1967. Published Dec. 17, 1968
Class 260—240.4
No Drawing. 12 Pages Specification Methine compounds useful as dyes for acrylic, modacrylic and acid modified polyester materials are prepared by condensation of certain aldehydes with isoindolo 1,2-b benzothiazolium compounds. These compounds have the structure infra:

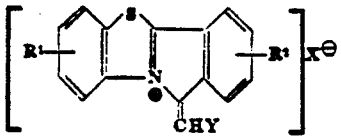

wherein $R^1$ and $R^2$ are the same or different and may be lower alkyl, halo, nitro, lower alkylsulfonyl, dialkylamino, lower alkoxy, lower alkylthio or cyano Y is an aldehyde residue of the formula:

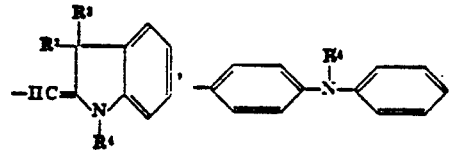

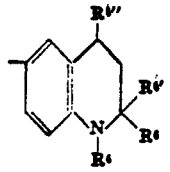

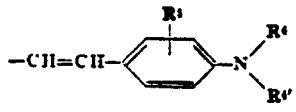

or

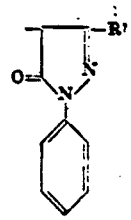

wherein $R^3$ is lower alkyl, $R^4$ and $R^{4'}$ are the same or different and each are H, lower alkyl, or lower alkyl substituted with halogen, hydroxy, alkoxy, nitro or dicarboximido groups $R^5$ is H, lower alkyl, lower alkoxy, lower alkylthio, lower alkanoylamido or lower alkylsulfonamido $R^6$, $R^{6'}$, and $R^{6''}$ are H or lower alkyl $R^7$ represents $R^4$, phenyl or phenyl substituted with lower alkyl, lower alkoxy or halogen X is any anion.